(12) United States Patent
Li et al.

(10) Patent No.: US 10,218,624 B2
(45) Date of Patent: *Feb. 26, 2019

(54) SERVICE INSTANCE MAPPING METHOD, APPARATUS AND SYSTEM

(71) Applicant: Huawei Technologies Co., Ltd., Shenzhen (CN)

(72) Inventors: Fei Li, Shenzhen (CN); Yizhou Li, Nanjing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,714

(22) Filed: Nov. 27, 2017

(65) Prior Publication Data

US 2018/0083881 A1 Mar. 22, 2018

Related U.S. Application Data

(63) Continuation of application No. 14/061,535, filed on Oct. 23, 2013, now Pat. No. 9,900,254, which is a continuation of application No. PCT/CN2011/073322, filed on Apr. 26, 2011.

(51) Int. Cl.
 *H04L 12/801* (2013.01)
 *H04L 12/723* (2013.01)
 *H04L 12/46* (2006.01)
(52) U.S. Cl.
 CPC .......... *H04L 47/17* (2013.01); *H04L 12/4662* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 8,213,296 B2* | 7/2012 | Shannon | H04L 41/08 370/216 |
| 8,315,159 B2* | 11/2012 | Monga | H04J 14/0284 14/284 |
| 2006/0245438 A1 | 11/2006 | Sajassi et al. | |
| 2006/0250948 A1* | 11/2006 | Zamfir | H04L 45/02 370/216 |

(Continued)

FOREIGN PATENT DOCUMENTS

| | | |
|---|---|---|
| CN | 101043395 A | 9/2007 |
| CN | 101133407 A | 2/2008 |

(Continued)

OTHER PUBLICATIONS

Perlman, R. et al., "RBridges: Base Protocol Specification, <draft-ieff-trill-rbridge-protocol-16.txt>," TRILL Working Group, Mar. 3, 2010, 117 pages.

(Continued)

*Primary Examiner* — Donald L Mills
(74) *Attorney, Agent, or Firm* — Slater Matsil, LLP

(57) ABSTRACT

Embodiments provide a service instance mapping method, apparatus and system. The service instance mapping method includes: correlating a layer-2 service instance with a service access port of the service instance, and determining correspondence between the service access port and a service instance identifier. The method also includes mapping the service instance identifier to a service label of a packet.

11 Claims, 4 Drawing Sheets

(56) References Cited

U.S. PATENT DOCUMENTS

| | | |
|---|---|---|
| 2008/0002720 A1 | 1/2008 | Chao et al. |
| 2008/0019385 A1 | 1/2008 | Sultan et al. |
| 2010/0226381 A1 | 9/2010 | Mehta et al. |
| 2011/0299414 A1* | 12/2011 | Yu .................. H04L 12/4641 370/252 |
| 2011/0299527 A1 | 12/2011 | Yu et al. |
| 2011/0299533 A1* | 12/2011 | Yu .................. H04L 12/4604 370/392 |
| 2012/0063316 A1 | 3/2012 | Ghanwani et al. |
| 2012/0243539 A1 | 9/2012 | Keesara |

FOREIGN PATENT DOCUMENTS

| | | |
|---|---|---|
| CN | 101257452 A | 9/2008 |
| CN | 102255819 A | 11/2011 |
| EP | 2226973 A1 | 9/2010 |

OTHER PUBLICATIONS

Eastlake, D. et al., "RBridges: Fine-Grained Labelling <draft-eastlake-trill-rbridge-fine-labeling-00.txt>," TRILL Working Group, Jun. 4, 2011, 20 pages.

Eastlake, D., "Future TRILL Work 2," Future Trill Work, Nov. 2010, 18 pages.

Hocdet, E., "[rbridge] Break 4096 VLAN limit," IETF TRILL WG mailing list, dated Sep. 10, 2010, 2 pages.

Schliesser, B., "Re: [rbridge] Break 4096 VLAN limit," IETF TRILL WG mailing list dated Sep. 11, 2010, 3 pages.

TRILL discussion archive on IETF web server, Nov. 2010, 25 pages.

IETF 79 Proceedings, Beijing, China, Nov. 7-12, 2010, 14 pages.

Andersson, L. et al., "Use of the Generalized Multi-Protocol Label Switching control plane for Point-to-Point Ethernet Label Switching-draft-andersson-gels-bof-prep-01.txt," Network Working Group, Internet-Draft, Expire date: Apr. 2006, 32 pages.

Katz, D. et al., "Three-Way Handshake for IS-IS Point-to-Point Adjacencies," Network Working Group, RFC5303, Oct. 2008, 11 pages.

* cited by examiner

SERVICE INSTANCE MAPPING METHOD, APPARATUS AND SYSTEM

CROSS-REFERENCE TO RELATED APPLICATIONS

This application is a continuation of U.S. patent application Ser. No. 14/061,535, filed on Oct. 23, 2013, which is a continuation of International Application No. PCT/CN2011/073322, filed on Apr. 26, 2011, both of which are hereby incorporated by reference in their entireties.

TECHNICAL FIELD

Embodiments of the present invention relate to the field of communications technologies, and in particular, to a service instance mapping method, apparatus and system.

BACKGROUND

Under the support of virtualization technologies, cloud computing can provide a scalable resource pool of computing, storage, and application services. A main development trend of cloud computing is to construct a network architecture having a high-capacity non-blocking data center, and various types of service applications can be supported on this basis. A network device needs to support a larger server cluster, migrate a virtual machine in a wider range when the virtual machine is applied, and ensure service continuity in a migration process. Therefore, cloud computing needs to meet the following three network requirements.

1. Non-blocking network architecture and multipath traffic balance.

Traffic characteristics of a data center (DC for short) are: Internal horizontal traffic (traffic between internal servers) is greater than vertical traffic (traffic between an internal server and an external client), and the internal horizontal traffic is highly bursty and cannot be planned beforehand. In a network architecture in a data center in the existing technology, a fat tree form tends to be adopted to construct non-convergence internal interconnection. In a fat tree network architecture, equal-cost multi-paths between nodes in the network need to be made good use of from a control layer to meet a non-blocking switching requirement, so that a problem of increasing horizontal traffic conflicts in the data center may be solved.

2. Adopt a large L2 (that is, data link layer, also referred to as layer 2) network to support a greater server cluster and virtual machine migration.

A traditional L2 technology cannot support multiple network paths, the utilization rate of a valid path of an entire network by the network after breaking loops by using a technology related to the Spanning Tree Protocol (STP for short) is very low, and a greater server cluster and a wider virtual machine migration range need a larger L2 network. A large L2 network can improve a migration range of a virtual machine and implement wide-range server sharing.

3. A public cloud requires a network to support a capability of identifying multiple tenants, so as to perform control over the tenants.

In construction of the public cloud, a huge number of service instances are required for identifying multiple tenants, and how to support more tenant services on a network device is also a problem. For example, a data center that includes 500K virtual machines needs a capability of supporting more than 10K service instances.

Currently, standard technologies of a large L2 network in a data center include: the Transparent Interconnection of Lots of Links (TRILL for short) technology of the Internet Engineering Task Force (IETF for short), and an 802.1aq technology of the Institute of Electrical and Electronics Engineers (IEEE for short). The basic principle of the two is: calculating shortest path first (SPF for short) of a layer-2 link at layer 2 according to a connection status of ports and links by using an Intermediate System to Intermediate System (ISIS for short), so as to obtain a cross-device shortest path. On a data plane, the two technologies adopt different encapsulation formats. The TRILL defines a TRILL header, and a layer-2 packet of a user is encapsulated in the TRILL header and forwarded hop by hop. The 802.1aq, that is, Shortest Path Bridging (SPB for short), uses a mac-in-mac (MacInMac) encapsulation format defined by 802.1ah, and defines a specific multicast header extension manner according to a protocol requirement, where an inner MAC of a MacInMac header is a layer-2 packet of a user. The two differ to some extent in a protocol control plane: A control plane of the TRILL protocol involves less calculation than the SPB, and meanwhile, use of network bandwidths can be balanced through a hop-by-hop equal-cost multi-path (ECMP for short); however, a current service instance of the TRILL protocol is an 802.1q virtual local area network (VLAN for short) identifier in a packet, where the identifier is 12 bits in total and there can be 4094 service instances at most, which limits the number of tenants that a public cloud can support. The SPB protocol mainly uses a service ingress to perform multipath load sharing, may plan service traffic globally and can support service instances of 16M. A control plane of the SPB protocol involves more calculation than the TRILL. In the TRILL protocol, a layer-2 packet of a user is encapsulated by using the TRILL header. The TRILL header includes a VLAN ID of a network transmission node (outer VLAN). ISIS routing calculation is performed according to the VLAN ID and in combination with an interconnected link. An intermediate node on a forwarding path performs selective learning according to whether the intermediate node has the service instance (with an inner VLAN encapsulated in a corresponding packet), and forwarding to a user port is performed at a destination node. The TRILL protocol is a process of equal-cost path routing for traffic scattered hop by hop on a forwarding path. In the SPB, a layer-2 packet of a user is encapsulated by using MacInMac encapsulation, and external BMAC+BVLAN are used to bear and forward the user packet between network devices, and a service identifier of the user is identified by an ISID (24 bits) in a specific I-TAG in the MacInMac header. The SPB performs forwarding learning according to MAC+ISID. A user packet may have multiple forms, including UN-TAG, single TAG, and dual TAG. On a forwarding plane of the SPB, different BVLANs form multiple equal-cost forwarding planes; and meanwhile, at a user access side, a mapping rule may be specified flexibly to map the user packet to a corresponding forwarding plane. Once a mapping relationship is specified at the ingress, the user packet arrives at its destination node device along an end-to-end fixed path determined through calculation. The biggest difference between forwarding behaviors of the SPB protocol and the TRILL protocol is: A forwarding path of the SPB protocol is determined in an end-to-end manner, its multipath loading sharing is subject to traffic allocation at the ingress, and traffic is mapped to different forwarding planes for sharing; while the TRILL protocol is a process of equal-cost path routing for traffic scattered hop by hop on a forwarding path.

Although the SPB protocol can provide more service instances (with a 24-bit ISID) to meet service requirements, a traffic model of load sharing of the SPB protocol is to perform fixed routing at the ingress. Compared with the TRILL protocol, the fixed routing manner of the SPB protocol cannot ensure maximum traffic load balance, the data center itself has much uncertain bursty traffic, and mapping can hardly be planned properly beforehand without a clear traffic model. Therefore, the SPB protocol is more vulnerable to a congested hotspot. Besides, in a case of network expansion for a data center with a fat tree architecture, the fixed routing of the SPB protocol easily leads to more ECMPs, and utilization of a valid path in the network is low when a path is planned in an end-to-end manner; while the TRILL protocol can better utilize a valid path in the network due to hop-by-hop shortest path distribution. In a fat tree network architecture, interconnected ECMPs of internal nodes continuously increase as the network scale increases (assuming that device capacity is constant), and it is increasingly difficult to make full use of network bandwidths by adopting the SPB protocol to calculate the fixed number of end-to-end paths; the hop-by-hop ECMP balancing manner of the TRILL protocol is obviously better.

In summary, although the hop-by-hop ECMP balancing manner of the TRILL protocol is obviously better, but the number of service instances is small and cannot satisfy more than 4K service instances. For example, it cannot meet a multi-tenant requirement from a public cloud.

SUMMARY

Embodiments of the present invention provide a service instance mapping method, apparatus, and system, which are used to overcome a defect in the existing technology that a TRILL protocol supports a small number of service instances, and implement support of more service instances.

An embodiment of the present invention provides a service instance mapping method. The method includes correlating a layer-2 service instance with a service access port of the service instance, and determining correspondence between the service access port and a service instance identifier, and mapping the service instance identifier to a service label of a packet.

An embodiment of the present invention further provides a service instance mapping apparatus. The apparatus includes a correlating module, configured to correlate a layer-2 service instance with a service access port of the service instance, and determine correspondence between the service access port and a service instance identifier. The apparatus also includes a mapping module, configured to map the service instance identifier to a service label of a packet.

An embodiment of the present invention further provides a service instance mapping system, including at least one data center, where the data center includes a service instance mapping apparatus described in any one embodiment of the present invention.

In the service instance mapping method, apparatus, and system in the embodiments of the present invention, after a layer-2 service instance is correlated with a service access port of the service instance, a service instance identifier corresponding to the service access port may be mapped to a service label of a packet. Because the service label is adopted to carry the service instance identifier, a higher service label supporting capability may be included, more service instances may be supported, and a multi-tenant requirement in a large-scale public cloud environment can be met; control protocol support is extended, and extension of the TRILL protocol can fulfill a higher service development capability.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may still derive other drawings according to these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1A:
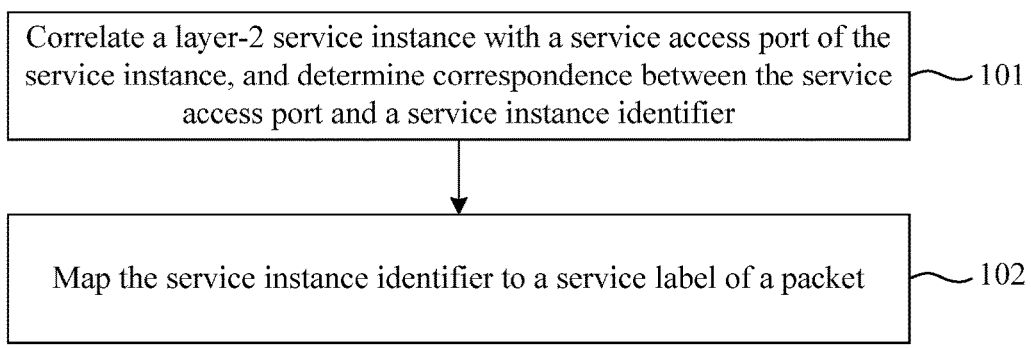
FIG. 1a is a flowchart of a service instance mapping method according to Embodiment 1 of the present invention.

FIG. 1a is a flowchart of a service instance mapping method according to Embodiment 1 of the present invention. As shown in FIG. 1a, the service instance mapping method may specifically include the following steps.

Step 101: Correlate a layer-2 service instance with a service access port of the service instance, and determine correspondence between the service access port and a service instance identifier.

The service instance in the embodiment of the present invention is a layer-2 (data link layer) network service. Different service instances are isolated in a network by means of layer-2 isolation, and correlation between the service access port of the service instance and the service instance may be specified in a command configuration manner. For example:

[RB1] service instance 100 name "S1"//create a service instance S1;

[PE2] interface vlanif 10

[PE1-Vlanif10] 12 binding service instance S1//correlate the service instance S1 with a vlan service access port interface vlanif 10.

Besides, in a certain network, each service instance corresponds to a globally unique service instance identifier, where the service instance identifier is formed of a numerical number, a string nickname, and so on. A corresponding service instance identifier may be allocated to the service instance when the service instance is correlated with the service access port; or a service instance identifier corresponding to the service instance may be preconfigured before the correlation. The service instance identifier may be mapped to a service label in a data packet, and transmitted between devices. Besides, a tenant identifier is an identifier of a tenant in a multi-tenant scenario. One tenant may lease multiple layer-2 service instances to meet a service application requirement of the tenant, that is, a tenant identifier of a tenant may correspond to multiple service instance identifiers.

Step 102: Map the service instance identifier to a service label of a packet.

Specifically, because a forwarding behavior defined by a TRILL protocol can better make use of a best possible path in the network and implement optimum spatial scattering of traffic, in the embodiment of the present invention, improvement is made by taking the TRILL control protocol as an example. A format of a TRILL packet is as shown in the following Table 1.

TABLE 1

FORMAT OF A TRILL PACKET

| Field Name | OuterDMAC | OuterSMAC | OuterVlanTAG | TRILL Head | User Pkt | FCS |
|---|---|---|---|---|---|---|
| Number of Bytes | 6 Bytes | 6 Bytes | 4 Bytes | 4 Bytes | | |

In Table 1, the TRILL packet includes from the beginning to end: a 6-byte outer destination MAC (OuterDMAC), a 6-byte outer source MAC (OuterSMAC), a 4-byte outer VLAN tag (OuterVlanTAG), a 4-byte TRILL header, a user data packet (User Pkt) being an 802.1q packet of a user, and a 4-byte frame check and frame check sequence (FCS for short) at the end. The outer MACs are bridge MACs of devices. If the packet is a unicast packet, the outer MACs are bridge MACs of two adjacent devices; if the packet is a broadcast packet, the source MAC is a bridge MAC of an ingress node, and the destination MAC is a specific multicast MAC. A device ID that serves as a basis of packet forwarding routing is defined in the TRILL header. A format of the TRILL header is as shown in the following Table 2:

TABLE 2

FORMAT OF A TRILL HEADER

| TRILL Eth-type | | | | | |
|---|---|---|---|---|---|
| V | R | M | Op-Length | Hop Count | |
| Egress RBridge Nickname | | | Ingress RBridge Nickname | | |

Important information fields in Table 2 are as follows: "TRILL Eth-type" is an Ethernet type of TRILL; "V" represents a TRILL version and is "0" before extension, a packet may be discarded directly when it is found that "V" is not "0", and "V" may be modified to "1" after extension; "M" is a flag indicating whether a packet is a multicast packet, where "0" represents unicast, and "1" represents multicast; "Op-Length" is the length of an extension option of the TRILL header and uses 4 bytes as a unit, a definition of a 124-byte option may be supported at most, and a first byte of each option in an option area complies with a format in the following Table 3:

TABLE 3

FIRST BYTE OF AN OPTION

| CHbH | CItE | Reserved |
|---|---|---|

In Table 3, if the CHbH bit is "1", it indicates that the option is hop-by-hop; while if the CItE is "1", it indicates that the option is end-to-end.

Moreover, an ID of a device at an ingress of a packet and an ID of a device at an egress of the packet correspond to a 16-bit routing bridge nickname (RBridge Nickname) respectively. For a unicast packet, the "M" flag is "0", and "Ingress Rbridge nickname" and "Egress Rbridge nickname" are nicknames of network devices corresponding to the ingress and the egress respectively; for a broadcast packet, the "M" flag is "1", "Ingress Rbridge nickname" is a nickname of an ingress device, and "Egress Rbridge nickname" is a device nickname of a used broadcast tree root node.

Figure 1B:
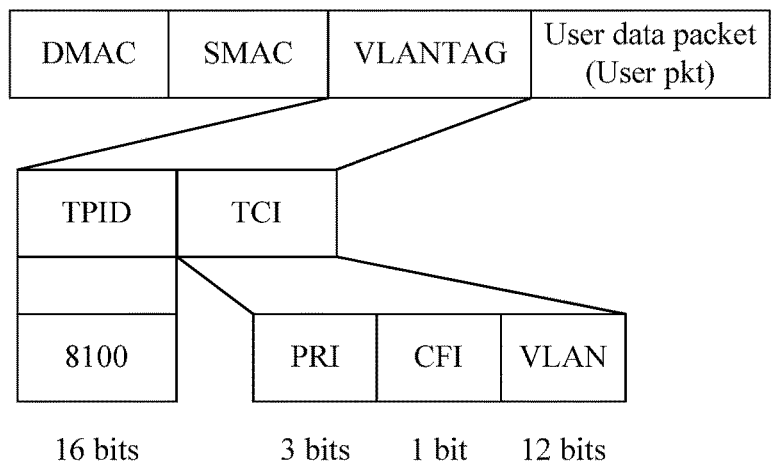
FIG. 1b is a schematic diagram of an 802.1q encapsulation format adopted in a TRILL packet in the service instance mapping method according to Embodiment 1 of the present invention.

In the TRILL protocol, an 802.1q packet encapsulation form at a user side is supported, that is, a packet actually borne in the "User Pkt" is an 802.1q packet, which carries a VLAN tag (Vlan TAG). The VLAN tag is a service label and is valid globally in an entire TRILL network. The VLAN tag may be the same as a VLAN tag of an accessing user, or may be a new VLAN tag obtained through VLAN conversion. FIG. 1b is a schematic diagram of an 802.1q encapsulation format adopted in a TRILL packet in the service instance mapping method according to Embodiment 1 of the present invention. As shown in FIG. 1b, the VLAN tag is formed of a 2-byte tag protocol identifier (TPID for short) and 2-byte tag control information (TCI for short), where the TPID is 8100 (hexadecimal), and the TCI includes 3-bit priority information (PRI for short) indicating a priority and 1-bit congestion factor information (CFI for short) indicating whether congestion has been undergone. A last VLAN field (that is, inner VLAN field of the TRILL packet) may store a 12-bit VLAN ID. In the TRILL network, on a basis that multipaths from each node to other nodes are calculated according to a network topology and a link overhead, path pruning may be performed for a broadcast packet according to service instances (inner VLAN) of a downstream node. Therefore, in the TRILL network, the VLAN ID stored in the inner VLAN field may serve as both an identifier of the service instance of the user and a tag of pruning the path of the broadcast packet. In the TRILL network, if the VLAN ID that is stored in the inner VLAN field and serves as the service instance identifier and the tag of pruning the path of the broadcast packet has 12 bits, up to 4094 inner VLANs may be supported. Because both the identifier of the service instance and the tag of pruning the forwarding path in the TRILL protocol are the VLAN ID stored in the inner VLAN field, a spatial capability of supporting more service instances may be obtained based on a definition manner of an extended service label of the inner VLAN field.

For example, the extended service label may have 20 bits, and 1M service instances may be supported by using the 20 bits. In this way, during ISIS protocol design, the number of network nodes may be controlled within 1K as much as possible, so as to control interfaces and switching capacity that the network devices can actually provide. 1M service instances can meet a service application requirement of 1K network nodes, and have a great potentiality of supporting future network expansion. A service label obtained through extension may adopt the following two examples:

Example 1: The 802.1q packet encapsulation format is combined with an extension option of the TRILL header, so that a capability of supporting a service label of 20 bits may be obtained through extension.

A user packet in the TRILL protocol is encapsulated in an 802.1q packet format, a VLAN field (that is, an inner VLAN field of TRILL) in a TCI field of the 802.1q packet is adopted to store lower 12 bits of the service label, and an option of the TRILL header is extended as the other higher 8 bits of the service label. Certainly, the 12 bits of the inner VLAN field of TRILL may be used as higher 12 bits, and the option of the TRILL header may be extended as lower 8 bits, or other available combination manners may be adopted. The option may be extended through a type length value (TLV for short) and occupy 4 bytes. A format of an extension option may be as shown in the following Table 4:

TABLE 4

| CHbH | CItE | Reserved | Type | Length | Lable High8 |
|---|---|---|---|---|---|
| First byte | | | Second byte | Third byte | Fourth byte |

A first byte of the extension option of the TRILL header may comply with a header format definition stipulated in the TRILL protocol. In the first byte, CHbH is a hop-by-hop flag bit, and CItE is an end-to-end flag bit, which define a manner of carrying the option respectively. Because a unique service instance identifier is used within a single TRILL field, CHbH may be "0", CItE may be "1", and the remaining reserved 6 bits are "0"s. A second byte may be type information, and its value may be provisionally defined as "1". A third byte may be information field length measured in bytes and used to define a subsequent option length, and its value may be "1". A fourth byte may be higher 8 bits of the service label (Lable High8). Table 4 shows only one example of an extension option format, and the extension option may also be in other practicable definition formats.

Example 2: A dual VLAN stacking (802.1q in 802.1q, QinQ for short) encapsulation form is adopted in a user packet field to bear a service label of 20 bits or 24 bits.

Figure 1C:
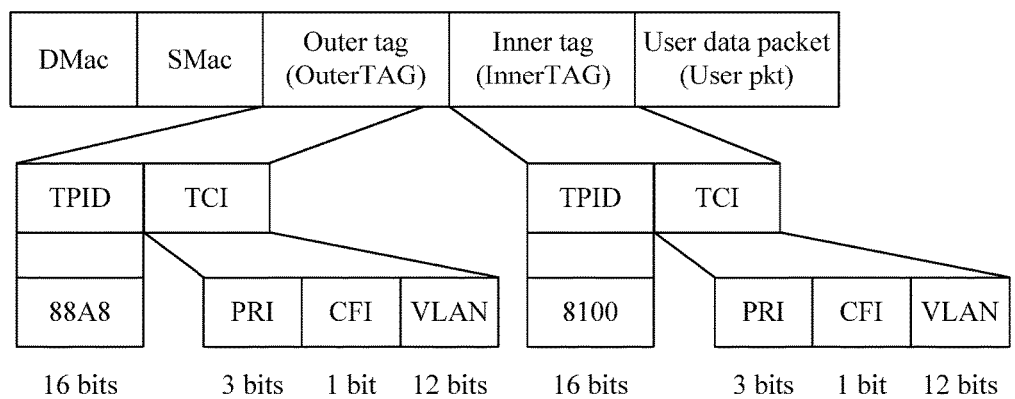
FIG. 1c is a schematic diagram of a QinQ packet encapsulation format in the service instance mapping method according to Embodiment 1 of the present invention.

FIG. 1c is a schematic diagram of a QinQ packet encapsulation format in the service instance mapping method according to Embodiment 1 of the present invention. As shown in FIG. 1c, a QinQ packet includes an inner VLAN tag and an outer VLAN tag. Each VLAN TAG is formed of a 2-byte TPID and 2-byte TCI. The TPID of the outer tag is 88A8 (hexadecimal), and the TPID of the inner tag is 8100 (hexadecimal). The TCI includes 3-bit PRI indicating a priority, 1-bit CFI indicating whether congestion has been undergone, and a 12-bit VLAN field at the end.

When a QinQ encapsulation format is adopted, the VLAN field of the inner tag may be used for storing lower 12 bits of a service label, lower 8 bits (which may also be higher 8 bits or 8 bits selected in another manner) in the 12 bits in the VLAN field of the outer tag may be used for storing higher 8 bits of the service label, and the remaining higher 4 bits may be a reserved field. Certainly, the VLAN field of the inner tag may be used for storing higher 12 bits of the service label, and lower 8 bits (which may also be higher 8 bits or 8 bits selected in another manner) in the 12 bits in the VLAN field of the outer tag may be used for storing lower 8 bits of the service label. By adopting the QinQ encapsulation format, a capability of supporting a service label of 20 bits may be obtained through extension.

Besides, the 12 bits in the VLAN field of the inner tag and the 12 bits in the VLAN field of the outer tag may be all used to store the service label. For example, the 12 bits in the VLAN field of the inner tag may store higher 12 bits of the service label, and the 12 bits in the VLAN field of the outer tag may store lower 12 bits of the service label; or, the 12 bits in the VLAN field of the inner tag may store lower 12 bits of the service label, and the 12 bits in the VLAN field of the outer tag may store higher 12 bits of the service label. By adopting the QinQ encapsulation format, a capability of supporting a service label of up to 24 bits may be obtained through extension.

The foregoing service label extending manners are only examples. Capabilities of the service label are not limited to the two capabilities of supporting 20 bits and 24 bits, and may also be other capabilities of supporting more than 12 bits. Extension may specifically be performed according to a requirement of an application scenario.

Preferably, after the extended service label is adopted, version number information "V" in the TRILL header may be upgraded from "0" to "1", which prevents a device not supporting the extended service label from making incorrect parsing determination. Certainly, upgrade may also not be performed, but a corresponding TLV is obtained through a control plane, and a correct connection relationship is ensured directly in a connection process of creating a neighbor relationship by an intermediate system to intermediate system HELLO (IS-IS HELLO, IIH for short).

Further, according to the foregoing examples of a service label definition, step 102 may specifically include any one of the following manners:

Manner 1: According to the foregoing example 1, the service instance identifier may be mapped to a virtual local area network field of a first virtual local area network tag of a Transparent Interconnection of Lots of Links packet and an extension option of a Transparent Interconnection of Lots of Links packet header, where the virtual local area network field of the first virtual local area network tag of the Transparent Interconnection of Lots of Links packet and the extension option of the Transparent Interconnection of Lots of Links header form the service label.

For example, lower 12 bits of the service instance identifier are mapped to the virtual local area network field of the first virtual local area network tag of the Transparent Interconnection of Lots of Links packet, and higher 8 bits of the service instance identifier are mapped to the extension option of the Transparent Interconnection of Lots of Links packet header; or higher 12 bits of the service instance identifier are mapped to the virtual local area network field of the first virtual local area network tag of the Transparent Interconnection of Lots of Links packet, and lower 8 bits of the service instance identifier are mapped to the extension option of the Transparent Interconnection of Lots of Links packet header.

Manner 2: According to the foregoing example 2, the service instance identifier is mapped to a virtual local area network field of a first outer tag and a virtual local area network field of a first inner tag in a dual-layer virtual local area network stacking packet, where the virtual local area network field of the first outer tag and the virtual local area network field of the first inner tag in the dual-layer virtual local area network stacking packet form the service label. For example:

Higher 8 bits of the service instance identifier are mapped to the virtual local area network field of the first outer tag in the dual-layer virtual local area network stacking packet, and lower 8 bits of the service instance identifier are mapped to the virtual local area network field of the first inner tag in the dual-layer virtual local area network stacking packet; or lower 8 bits of the service instance identifier are mapped to the virtual local area network field of the first outer tag in the dual-layer virtual local area network stacking packet, and higher 8 bits of the service instance identifier are mapped to the virtual local area network field of the first inner tag in the dual-layer virtual local area network stacking packet; or higher 12 bits of the service instance identifier are mapped to the virtual local area network field of the first outer tag in the dual-layer virtual local area network stacking packet, and lower 12 bits of the service instance identifier are mapped to the virtual local area network field of the first inner tag in the dual-layer virtual local area network stacking packet; or lower 12 bits of the service instance identifier are mapped to the virtual local area network field of the first outer tag in the dual-layer virtual local area network stacking packet, and higher 12 bits of the service instance identifier are mapped to the virtual local area network field of the first inner tag in the dual-layer virtual local area network stacking packet.

Besides, in the service instance mapping method, an original virtual local area network identifier may still be retained, and the virtual local area network identifier may be mapped to an original virtual local area network field, which may also specifically include the following examples:

Example 1: The virtual local area network identifier of the service instance is mapped to a virtual local area network field of a second virtual local area network tag in the Transparent Interconnection of Lots of Links packet.

Figure 1D:
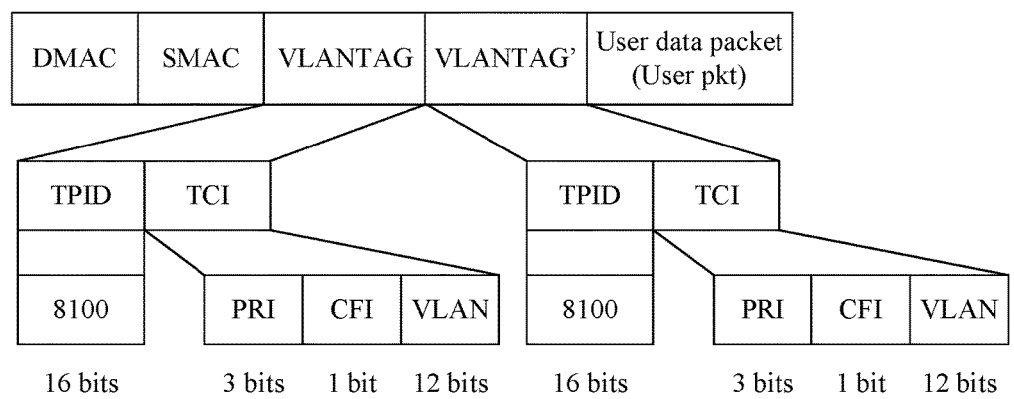
FIG. 1d is another schematic diagram of an 802.1q encapsulation format adopted in a TRILL packet in the service instance mapping method according to Embodiment 1 of the present invention.

FIG. 1d is another schematic diagram of an 802.1q encapsulation format adopted in a TRILL packet in the service instance mapping method according to Embodiment 1 of the present invention. As shown in FIG. 1d, the first virtual local area network tag in the Transparent Interconnection of Lots of Links (TRILL) packet mentioned in the foregoing example may be a VLANTAG (reference may also be made to FIG. 1b), and the second virtual local area network tag in the TRILL packet may be a newly added VLANTAG'; certainly, it is also feasible that the first virtual local area network tag is a VLANTAG' and the second virtual local area network tag is a VLANTAG. In this way, the TRILL packet not only can carry the service instance identifier in the first virtual local area network tag, but also can carry the original VLAN identifier of the service instance in the second virtual local area network tag, so as to be compatible with the original TRILL protocol.

Example 2: The virtual local area network identifier of the service instance is mapped to a virtual local area network field of a second outer tag and/or a virtual local area network field of a second inner tag in a dual-layer virtual local area network stacking packet.

Similar to example 1, on the basis of FIG. 1c, an OuterTAG' and an InnerTAG' may be newly added. If the first outer tag of the dual-layer virtual local area network stacking (QinQ) packet is an OuterTAG, the second outer tag is an OuterTAG'; if the first inner tag is an InnerTAG, the second inner tag is an InnerTAG', and vice versa. The original VLAN identifier of the service instance is carried in the second outer tag and/or the second inner tag. Both the service label and the VLAN identifier may be carried, so as to be compatible with the original TRILL protocol.

In a TRILL network, a layer-2 service instance is identified by adopting an extended service label, and a more flexible service mapping manner is required in order to meet a user-side access requirement of the data center. A user-side access port may include a single VLAN encapsulation form and a QinQ encapsulation form. Both of the encapsulation forms may be flexibly mapped to an extended service label and switched in a service instance. An access-side VLAN, regardless of whether in the single VLAN or QinQ encapsulation form, may adopt a local VLAN of a local node, and global consistency is not required. Through modification performed on the basis of the original TRILL protocol, a service label solution of greater capacity may be supported.

In the original TRILL protocol, a VLAN identifier of a service instance is directly stored in a VLAN field in a TCI field of a packet that adopts an 802.1q encapsulation format. After the service label is extended, 2 bytes of the original VLAN field may be extended to 4 bytes capable of supporting the extended service label. In the 4 bytes, lower 24 bits serve as the extended service label, and 1 byte is reserved. Besides, an extended TLV, such as a service label supporting capability (Service label Capability) TLV, may be added in a Hello packet to transfer the service label supporting capability of the node. A final service label selection manner of the system is determined through negotiation. Referring to Table 5, Table 5 shows relevant layer-2 TLVs of a modified TRILL protocol.

TABLE 5

| TRILL PROTOCOL EXTENDING MANNER | | | |
|---|---|---|---|
| Application Stage | TLV Type | Sub (sub)-TLV Type | Modification Scheme |
| LSP | MAC-Reachability | | Modify RSV + VLAN (2 bytes) to reserved (1 byte) + ServiceLable (3 bytes) |

TABLE 5-continued

TRILL PROTOCOL EXTENDING MANNER

| Application Stage | TLV Type | Sub (sub)-TLV Type | Modification Scheme |
|---|---|---|---|
| IIH | TLV Multi Topology aware Port Capability TLV | Special VLANs and Flags sub-TLV | [4 bytes in total] Keep the content and format unchanged; however, considering that a mapping manner of an extended service label surpasses a VLAN mapping (VLANMapping) function defined in original TRILL, it is feasible to remove an OuterVLAN field in it, and configure and store mapping information and a flag through a local node instead of transmitting the mapping information and the flag |
| IIH | | Enabled-VLANs sub-TLV | Extend a VLAN to a service label, modify an original 2-byte Start VLAN ID to a service label ServiceLable (3 bytes) + reserved (1 byte), and modify a VLAN bitmap to a service label bitmap (ServiceLable bitmap) |
| IIH | | Appointed Forwarders sub-TLV | Unchanged |
| LSP | Router Capability TLV | TRILL Version sub-TLV | Keep the format unchanged. Let a version number be greater than a current TRILL version by 1. For example, the version number is "1" |
| LSP | | Nickname sub-TLV | Unchanged |
| LSP | | Trees sub-TLV | Unchanged |
| LSP | | Tree Identifiers Sub-TLV | Unchanged |
| LSP | | Trees Used Identifiers Sub-TLV | Unchanged |
| LSP | | Interested VLANs and Spanning Tree Roots sub-TLV | Unchanged; the application scenario may be limited to single VLAN access, and QinQ access may not be supported |
| LSP | | The VLAN Group sub-TLV | Unchanged; the sub-TLV may not be used; the new ServiceLable is independent of a VLAN; and shared learning may not be distinguished from independent learning |
| LSP | Group Address TLV | Group MAC Address sub-TLV | Extend a VLAN to a service label, and modify an original 2-byte RESV + VLAN ID to ServiceLable (3 bytes) + reserved (1 byte) |
| IIH | Service label Capability TLV | | Carry the TLV in the Hello packet |

According to Table 5, the service instance mapping method may further include any one of the following steps: sending an initial access (IIH) message that carries a Multi Topology aware Port Capability (Multi Topology aware Port Capability TLV), where an Enabled-VLANs (Enabled-VLANs sub-TLV) of the multi topology aware port capability includes an extended service label information (ServiceLable) field; sending a layered service provision (LSP) message that carries MAC-Reachability (MAC-Reachability TLV), where the medium access control reachability includes an extended service label information (ServiceLable) field; and sending a layered service provision message that carries a Group Address (Group Address TLV), where a Group MAC Address (Group MAC Address sub-TLV) of the group address carries an extended service label information field.

Besides, in Table 5, a Service label Capability TLV is a newly extended TLV, and for its format, reference may be made to the following Table 6:

TABLE 6

| Field | Number of Bytes |
|---|---|
| Type = Srv-Cap | 1 byte |
| Length | 1 byte |
| Resv | T3 | T2| T1 Service label Ability Announcement | 1 byte |
| Resv |T3 | T2| T1 Service label Negotiation | 1 byte |

In Table 6, "Type" refers to a type of a TLV, and for example, may have a value "146"; "Length" refers to the length of TLV information, and for example, may have a value "2"; "Service label Ability Announcement" refers to an announcement of the form of a service label of the node, where "T1" refers to carrying a 20-bit label in a form of QinQ, "T2" refers to support a 20-bit label in a manner of extending a TRILL header option, and "T3" refers to carrying a 24-bit label in a form of QinQ. "Service label Negotiation" refers to negotiating between nodes to finally determine a label carrying manner between the nodes, where "T1, T2, and T3" have same definitions as those described in the foregoing. A three-way handshake manner is adopted in the negotiation process, and, when a neighbor relationship is created, a use manner is selected and negotiated as regards how to adopt a service label. Afterward, label interaction capability negotiation processing may be added at an IIH stage. Specifically, the three-way handshake manner is adopted at the IIH stage to add a newly extended Service label Capability TLV into an initial packet. A local node broadcasts its service label capability in the initial packet. When receiving the announcement, a neighbor of a peer node returns a Service label Capability TLV according to its own capability matching status, and at the same time, sends a point-to-point three-way adjacency TLV to return its own processing result. A neighbor relationship may be created if the service label supporting capability of the local node matches the service label supporting capability of the peer node. Therefore, the service instance mapping method may further include a step of negotiating, by adjacent devices, a service label supporting capability in a process of initially establishing a connection through a handshake, which specifically includes receiving an initial access message that carries a service label supporting capability of a peer node and a three-way handshake state being an unconnected state, negotiating according to a service label supporting capability of a local node and the service label supporting capability of the peer node to determine a service label supporting capability for establishing a connection, and sending to the peer node a notification that carries the service label supporting capability for establishing a connection and indicates that the three-way handshake state has changed to a connection-established state.

The negotiating according to a service label supporting capability of a local node and the service label supporting capability of the peer node to determine a service label supporting capability for establishing a connection may specifically include: if the service label supporting capability of the local node matches the service label supporting capability of the peer node, changing the three-way handshake state to the connection-established state and determining the matched service label supporting capability as the service label supporting capability for establishing a connection, or if the service label supporting capability of the local node does not match the service label supporting capability of the peer node, determining a lower service label supporting capability from the service label supporting capability of the local node and the service label supporting capability of the peer node as the service label supporting capability for establishing a connection.

Specifically, in the embodiment of the present invention, a state machine created by a point-to-point (P2P) neighbor is modified. A process of creating a state machine by an original P2P neighbor is as shown in the following Table 7:

TABLE 7

STATE MACHINE CREATED BY AN ORIGINAL P2P NEIGHBOR

| | | Received Adjacency Three-Way State | | |
|---|---|---|---|---|
| | | Unconnected (Down) | Initializing (Initializing) | Connection-established (Up) |
| Adjacency Three-Way State | Down | Initialize | Up | Down |
| | Initializing | Initialize | Up | Up |
| | Up | Initialize | Accept | Accept |

Figure 1E:
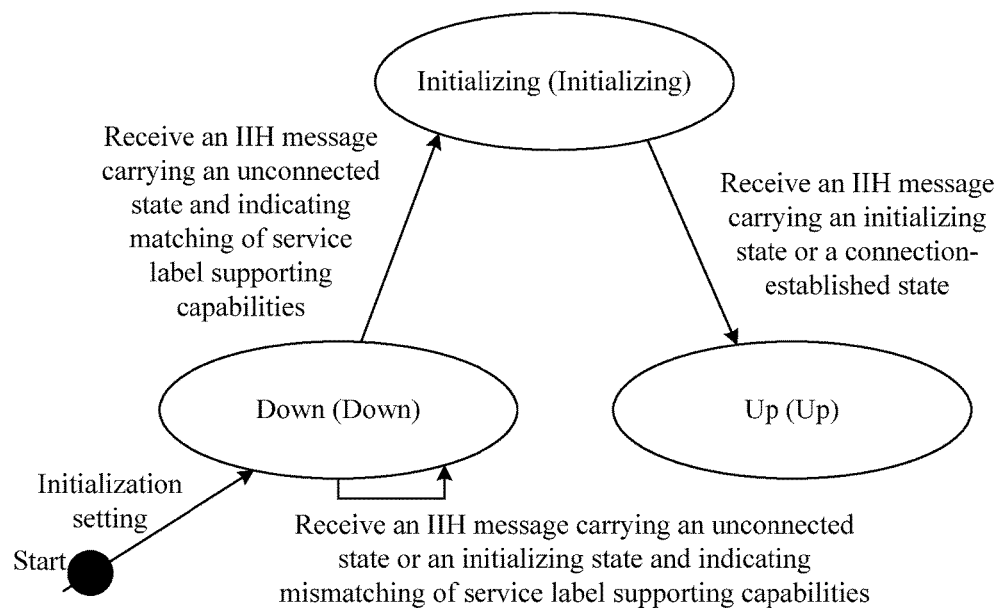
FIG. 1e is a schematic diagram of a state machine created by a neighbor of extended P2P in the service instance mapping method according to Embodiment 1 of the present invention.

FIG. 1e is a schematic diagram of a state machine created by a neighbor of extended P2P in the service instance mapping method according to Embodiment 1 of the present invention. As shown in FIG. 1e, when receiving an IIH message that carries a service label and a three-way handshake state being unconnected (Down), the local node needs to determine, according to the service label supporting capability of the local node, whether a neighbor relationship can be created with the peer node. If the service label supporting capabilities do not match, the local node notifies the peer node of the Down state through a handshake state TLV and carries its own service label supporting capability. If the service label supporting capabilities of the two sides match, the local node may change the state to the connection-established (Up) state, sets the handshake state TLV to the UP state, and notifies the peer node in combination with its own service label supporting capability. After verification of the service label supporting capability is added, P2P neighbor creation may be as shown in Table 8.

TABLE 8

STATE MACHINE CREATED BY A NEW P2P NEIGHBOR

| | | Received Adjacency Three-Way State | | |
|---|---|---|---|---|
| | | Unconnected (Down) | Initializing (Initializing) | Connection-established (Up) |
| Adjacency Three-Way State | Down | Initializing (Initialize)/Down | Up/Down | Down |
| | Initializing | Initialize | Up | Up |
| | Up | Initialize | Accept | Accept |

In Table 8, if a state of the local node is Down, when the IIH message received from the peer node carries a service label supporting capability and a peer state being Down, it is determined whether the service label supporting capability of the local node matches the service label supporting capability of the peer node. If they match, the state of the local node may be modified to Initialize; if they do not match, the state of the local node remains as Down. If the state of the local node is Initializing, when the IIH message received from the peer node carries a service label supporting capability and a peer state being Down, it is determined whether the service label supporting capability of the local node matches the service label supporting capability of the peer node. If they match, the state of the local node is modified to Up; otherwise, the state of the local node remains as Down.

Besides, if a node capable of identifying a service label creates a neighbor relationship with a node incapable of identifying a service label, or if a node with a high service label supporting capability creates no neighbor relationship with another high-capability node, the service label supporting capability may be lowered, so that a neighbor relationship is created with a low-capability node by using a lower service label supporting capability, such as an old-version TLV. In this way, after a high-capability node creates a neighbor relationship with a low-capability node, the high-capability node becomes a low-capability node, thereby ensuring effective networking of a network.

In the embodiment, after a layer-2 service instance is correlated with a service access port of the service instance, a service instance identifier corresponding to the service access port may be mapped to a service label of a packet. Because the service label is adopted to carry the service instance identifier, a higher service label supporting capability may be included, more service instances may be supported, and a multi-tenant requirement in a large-scale public cloud environment can be met, which is a large L2 solution; control protocol support is extended, extension of the TRILL protocol can fulfill a higher service development capability, and multiple service scenarios may be supported through flexible service mapping manners.

Embodiment 2

Figure 2A:
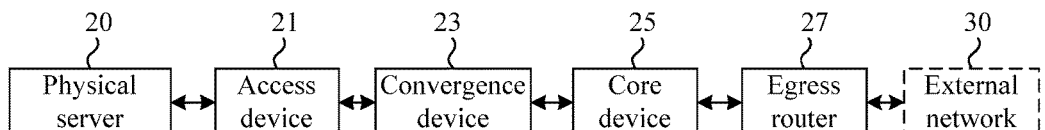
FIG. 2a is a schematic diagram of an application scenario of a service instance mapping method according to Embodiment 2 of the present invention.

FIG. 2a is a schematic diagram of an application scenario of a service instance mapping method according to Embodiment 2 of the present invention. As shown in FIG. 2a, a basic physical architecture of a data network of a data center includes: an access device 21, a convergence device 23, a core device 25, and an egress router 27. Such devices construct a network to connect a physical server 20 of the data center to an external network 30. In an actual network, forms of physical devices are as follows: The access device and the convergence device may be a frame-type or box-type switch, the core device may be a frame-type switch, and the convergence device and the core device may be integrated into one to simplify a network hierarchy.

Figure 2B:
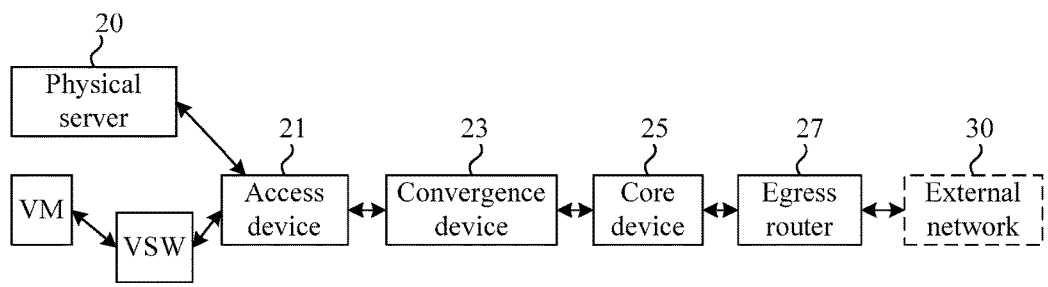
FIG. 2b is a schematic diagram of another application scenario of the service instance mapping method according to Embodiment 2 of the present invention.

FIG. 2b is a schematic diagram of another application scenario of the service instance mapping method according to Embodiment 2 of the present invention. As shown in FIG. 2b, because a server may support virtualization, multiple virtual machines (VM for short) may be generated on a physical server 20 through virtualization by using software, and connected to the access device 21 through a software virtual switch (VSW for short) that is generated through virtualization by using software of the physical server 20.

The service instance mapping method in the embodiment of the present invention may be deployed and implemented on the access device 21, the convergence device 23, and the core device 25. The access device mainly implements user-side service access. The access device may perform only VLAN tagging, and an upper-level convergence device correlates a service access port with a service instance to implement mapping from a service instance identifier to a packet; or the access device may correlate the service access port with the service instance after performing the VLAN tagging, and then map the service instance identifier to a service label of the packet directly. The convergence device 23 and the core device 25 may serve as access nodes of the service instance, intermediate nodes for forwarding the service instance, or edge nodes for converting the service instance. When the convergence device and the core device serve as the access nodes of the service instance, a corresponding access node implements only single VLAN tagging or QinQ tagging of a user service, and the convergence device 23 or the core device 25 correlate the service access port with the service instance to implement mapping from the service instance identifier to the packet. If the convergence device 23 or the core device 25 serves as an intermediate node, the access device 21 may implement mapping from a user service access interface to the service instance, and the convergence device 23 or the core device 25 implements service instance interconnection between different access nodes.

Besides, the physical server may access the access device without a tag (UNTAG) or by using a network card to attach a service label. The VSW may be interconnected to the access device in three modes: virtual edge bridge (VEB for short), virtual edge port aggregator (VEPA for short), and multi-channel. The VEB may perform internal port switching, send external traffic, and encapsulate a user packet in a single VLAN form; the VEPA does not perform local node switching, but sends all traffic to an external access device for switching and encapsulates a user packet in a single VLAN form; and Multi-channel corresponds to multiple VEBs and VEPAs, and accesses an access switch by attaching an outer VLAN.

In summary, service label mapping and deploying manners inside a data center include various combination manners, and are specifically as shown in the following Table 9:

TABLE 9

COMBINATION MANNERS OF SERVICE LABEL MAPPING AND DEPLOYING

| Combination Manner | Physical Server | VSW | Access Device | Convergence Device and Core Device |
|---|---|---|---|---|
| 1 | UNTAG access | | Add a VLAN according to a user access port to obtain a service access port, correlate the service access port with a service instance, and map an instance identifier to a service label of a packet | Serve as intermediate devices |
| 2 | UNTAG access | | Add a VLAN according to a user access port to obtain a service access port | Correlate the service access port of the access device with a service instance, and map a service instance identifier to a service label of a packet |
| 3 | Access by using a network card to attach a VLAN | | Re-map a VLAN according to a user access port to obtain a service access port, and map the service access port to a service label of a packet; it may be selected to trust a priority tag in a VLAN of a user, or perform re-mapping to modify the | Serve as intermediate devices |

TABLE 9-continued

COMBINATION MANNERS OF SERVICE LABEL MAPPING AND DEPLOYING

| Combination Manner | Physical Server | VSW | Access Device | Convergence Device and Core Device |
|---|---|---|---|---|
| | | | priority tag | |
| 4 | Access by using a network card to attach a VLAN | | Re-map a VLAN or QinQ encapsulation according to a user access port to obtain a service access port; it may be selected to trust a priority tag in a VLAN of a user, or perform re-mapping to modify the priority tag | Map to a service label of a packet according to the service access port of the access device |
| 5 | | VEB mode VEPA mode | Map a VSW access port + VLAN to a service label of a packet; it may be selected to trust a priority tag in a VLAN of an access packet, or perform re-mapping to modify the priority tag | Serve as intermediate devices |
| 6 | | VEB mode VEPA mode | Re-map a VLAN or QinQ encapsulation according to a VSW access port to obtain a service access port; it may be selected to trust a priority tag in a VLAN of an access packet, or perform re-mapping to modify the priority tag | Map to a service label of a packet according to a service access port of the access device |
| 7 | | Multi-Channel mode | Combine an outer SVLAN of a Multi-channel QinQ encapsulation with an inner CVLAN to obtain a service access port, which is mapped together to a service label of a packet; it may be selected to trust a priority tag in a VLAN of an access packet, or perform re-mapping to modify the priority tag | Serve as intermediate devices |
| 8 | | Multi-Channel mode | Combine an outer SVLAN of a Multi-channel QinQ encapsulation with an inner CVLAN, and map them together to the QinQ encapsulation to obtain a service access port; it may be selected to trust a priority tag in a VLAN of an access packet, or perform re-mapping to modify the priority tag | Map to a service label of a packet according to a service access port of the access device |

The service access port in Table 9 is in a form of "user access port+VLAN", "user access port+QinQ", "VSW access port+VLAN", "VSW access port+QinQ", or "SVLAN+CVLAN" correspondingly.

In the embodiment, an extended service label in a TRILL protocol is adopted to store a VLAN identifier, and a capability of supporting a service label of 20/24 bits may be included, which can make full use of an equal-cost path in a network, support more service instances in combination with a shortest path application, and fulfill a multi-tenant L2 network isolation requirement in a large-scale public cloud environment, and is a large L2 solution; control protocol support is extended, extension of the TRILL protocol can fulfill a higher service development capability, and multiple service scenarios may be supported through flexible service mapping manners. The deploying manner is flexible, and existing devices may be made full use of. For example, a low-end switch device may be used as an access device, while a service instance mapping apparatus is disposed on the convergence device to implement enhancement. Therefore, system construction is cost-efficient on the whole. Besides, because improvement is made based on the TRILL protocol, a network device needs only small modification and is well compatible with the existing TRILL protocol, and extensibility may be performed easily.

Persons of ordinary skill in the art should understand that all or part of the steps of the foregoing method embodiments may be implemented by a program instructing relevant hardware. The program may be stored in a computer readable storage medium. When the program runs, the steps of the foregoing method embodiments are performed. The storage medium includes any medium capable of storing program codes, such as a ROM, a RAM, a magnetic disk, or an optical disk, or the like.

Embodiment 3

Figure 3:
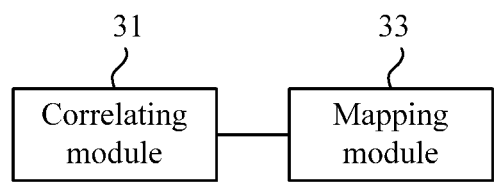
FIG. 3 is a schematic structural diagram of a service instance mapping apparatus according to Embodiment 3 of the present invention.

FIG. 3 is a schematic structural diagram of a service instance mapping apparatus according to Embodiment 3 of the present invention. As shown in FIG. 3, the service instance mapping apparatus includes a correlating module 31, configured to correlate a layer-2 service instance with a service access port of the service instance, and determine correspondence between the service access port and a service instance identifier, and a mapping module 33, configured to map the service instance identifier to a service label of a packet.

Specifically, the service instance in the embodiment of the present invention is a layer-2 (data link layer) network service. Different service instances are isolated in a network by means of layer-2 isolation, and correlation between the service access port of the service instance and the service instance may be specified in a command configuration manner. In a certain network, each service instance corresponds to a globally unique service instance identifier, where the service instance identifier is formed of a numerical number, a string nickname, and so on. A corresponding service instance identifier may be allocated to the service instance when the service instance is correlated with the service access port; or a service instance identifier corresponding to the service instance may be preconfigured before the correlation. The service instance identifier may be mapped to a service label in a data packet, and transmitted between devices. For a method of mapping the service instance identifier to the service label of the packet by the mapping module, improvement may be made based on a TRILL protocol. For details, reference may be made to relevant description in Embodiment 1 and Embodiment 2 of the present invention.

In the embodiment, after the correlating module correlates a layer-2 service instance with a service access port of the service instance, the mapping module may map a service instance identifier corresponding to the service access port to a service label of a packet. Because the service label is adopted to carry the service instance identifier, a higher service label supporting capability may be included, more service instances may be supported, and a multi-tenant requirement in a large-scale public cloud environment can be met, which is a large L2 solution; control protocol support is extended, extension of the TRILL protocol can fulfill a higher service development capability, and multiple service scenarios may be supported through flexible service mapping manners.

Embodiment 4

Figure 4:
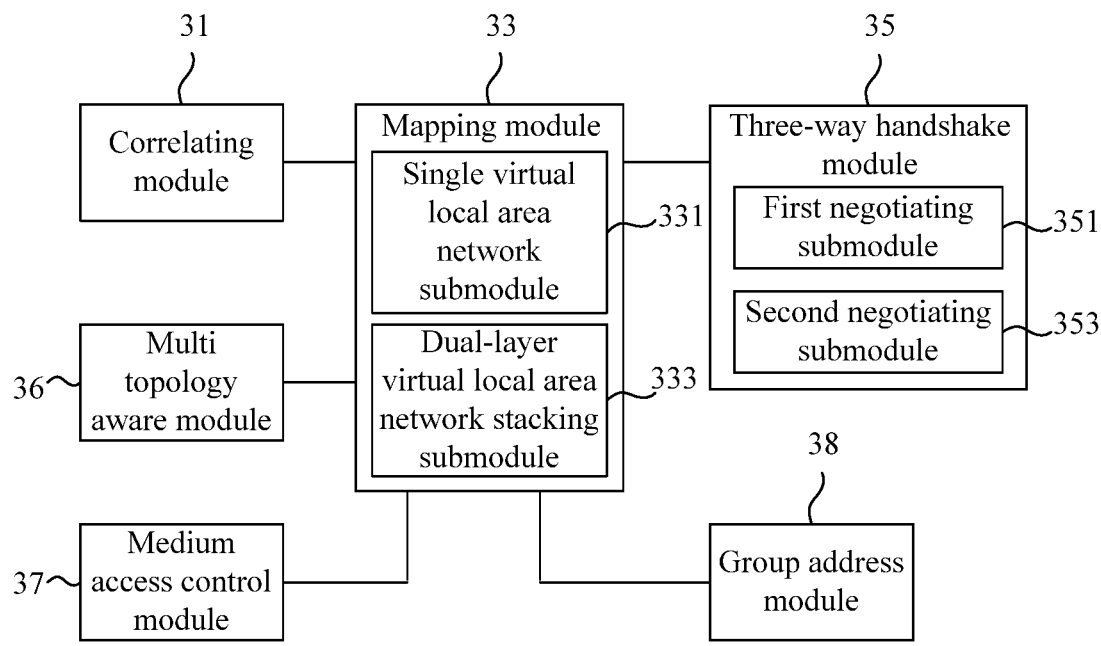
FIG. 4 is a schematic structural diagram of a service instance mapping apparatus according to Embodiment 4 of the present invention.

FIG. 4 is a schematic structural diagram of a service instance mapping apparatus according to Embodiment 4 of the present invention. As shown in FIG. 4, based on Embodiment 3, the mapping module 33 of the service instance mapping apparatus may include a single virtual local area network submodule 331, configured to map the service instance identifier to a virtual local area network field of a first virtual local area network tag of a Transparent Interconnection of Lots of Links packet and an extension option of a Transparent Interconnection of Lots of Links packet header, where the virtual local area network field of the first virtual local area network tag of the Transparent Interconnection of Lots of Links packet and the extension option of the Transparent Interconnection of Lots of Links header form the service label, or a dual-layer virtual local area network stacking submodule 333, configured to map the service instance identifier to a virtual local area network field of a first outer tag and a virtual local area network field of a first inner tag in a dual-layer virtual local area network stacking packet, where the virtual local area network field of the first outer tag and the virtual local area network field of the first inner tag in the dual-layer virtual local area network stacking packet form the service label.

Further, the single virtual local area network submodule 331 is further configured to map a virtual local area network identifier of the service instance to a virtual local area network field of a second virtual local area network tag in the Transparent Interconnection of Lots of Links packet, or the dual-layer virtual local area network stacking submodule 333 is further configured to map a virtual local area network identifier of the service instance to a virtual local area network field of a second outer tag and/or a virtual local area network field of a second inner tag in the dual-layer virtual local area network stacking packet.

Still further, the service instance mapping apparatus may further include any one or more of the following modules a three-way handshake module 35, configured to: receive an initial access message that carries a service label supporting capability of a peer node and a three-way handshake state being an unconnected state; negotiate according to a service label supporting capability of a local node and the service label supporting capability of the peer node to determine a service label supporting capability for establishing a connection; and send to the peer node a notification that carries the service label supporting capability for establishing a connection and indicates that the three-way handshake state has changed to a connection-established state, a multi topology aware module 36, configured to send an initial access message that carries a multi topology aware port capability, where an enabled virtual local area network of the multi topology aware port capability includes an extended service label information field, a medium access control module 37, configured to send a layered service provision message that carries medium access control reachability, where the medium access control reachability includes an extended service label information field, and a group address module 38, configured to send a layered service provision message that carries a group address, where a group medium access control address of the group address carries an extended service label information field.

The three-way handshake module 35 may include a first negotiating submodule 351, configured to: if the service label supporting capability of the local node matches the service label supporting capability of the peer node, change the three-way handshake state to the connection-established state and determine the matched service label supporting capability as the service label supporting capability for establishing a connection, and a second negotiating submodule 353, configured to: if the service label supporting capability of the local node does not match the service label supporting capability of the peer node, determine a lower service label supporting capability from the service label supporting capability of the local node and the service label supporting capability of the peer node as the service label supporting capability for establishing a connection.

For working processes and working principles of the modules and submodules in the embodiment, reference may be made to the description in the foregoing method embodiments, and details are not repeatedly described here.

Besides, in the embodiment of the present invention, a device supporting the service instance mapping method, namely, the service instance mapping apparatus, may also be applied to a MEN network of telecommunications. For example, by using a convergence switch, a DSLAM accesses the Internet, and a PTN network performs mobile backhaul. Such networks belong to layer-2 (L2) access, and have some loop forms to ensure switchover. By adopting the service instance mapping method in the embodiment of the present invention, advantages such as flexible configuration and automatic routing may be provided and considered, and meanwhile, there are high-capacity service labels which may fulfill service application requirements.

In the embodiment, after the correlating module correlates a layer-2 service instance with a service access port of the service instance, each submodule of the mapping module may map a service instance identifier corresponding to the service access port to a service label of a packet. Because the service label is adopted to carry the service instance identifier, a higher service label supporting capability may be included, more service instances may be supported, and a multi-tenant requirement in a large-scale public cloud environment can be met, which is a large L2 solution; control protocol support is extended, extension of the TRILL protocol can fulfill a higher service development capability, and multiple service scenarios may be supported through flexible service mapping manners.

Embodiment 5

Embodiment 5 of the present invention provides a service instance mapping system. The service instance mapping system includes at least one data center.

In the data center, a service instance mapping apparatus of any structure described in the embodiments of the present invention may be adopted.

Specifically, a structure of the data center may include devices such as a physical server, an access device, a convergence device, a core device, and an egress router, referring to FIG. 2a and its relevant description in Embodiment 2; on the physical server of the data center, multiple virtual machines or virtual switches may be generated through virtualization by using software, referring to FIG. 2b and its relevant description in Embodiment 2. The service instance mapping apparatus may be disposed in a virtual switch of the physical device, an access device, a convergence device, a core device, or an egress router.

In the data center in the embodiment, after a layer-2 service instance is correlated with a service access port of the service instance, a service instance identifier corresponding to the service access port may be mapped to a service label of a packet. Because the service label is adopted to carry the service instance identifier, a higher service label supporting capability may be included, more service instances may be supported, and a multi-tenant requirement in a large-scale public cloud environment can be met, which is a large L2 solution; control protocol support is extended, extension of the TRILL protocol can fulfill a higher service development capability, and multiple service scenarios may be supported through flexible service mapping manners.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features in the technical solutions, as long as such modifications or replacements do not cause the essence of the corresponding technical solutions to depart from the spirit and scope of the technical solutions of the embodiments of the present invention.

What is claimed is:

1. A method, comprising:
receiving, by a Transparent Interconnection of Lots of Links (TRILL) switch, an Ethernet user packet comprising a virtual local area network (VLAN) ID;
generating, by the TRILL switch, a TRILL packet, wherein the TRILL packet has a 2-byte outer tag and a 2-byte inner tag, the 2-byte outer tag and a 2-byte inner tag both following an inner MAC header that follows a TRILL header of the TRILL packet, wherein a service label of 24 bits is carried by the outer tag and the inner tag, wherein 12 bits in the outer tag store higher 12 bits of the service label, and 12 bits in the inner tag store lower 12 bits of the service label, wherein the service label is mapped from the VLAN ID, and wherein the service label of 24 bits is an extended service label identifying a service instance, and wherein different service instances are isolated by layer-2 isolation in a TRILL network in which the TRILL switch is located; and
sending, by the TRILL switch, the TRILL packet to another TRILL switch in the TRILL network.

2. The method according to claim 1, further comprising:
sending, by the TRILL switch, an initial access message that carries a multi topology aware port capability, wherein an enabled virtual local area network field of the multi topology aware port capability comprises a first extended service label information field.

3. A switch, comprising:
a processor; and
network ports coupled to the processor, wherein the processor is configured to:
receive an Ethernet user packet comprising a virtual local area network (VLAN) ID from a network port in the network ports;
generate a Transparent Interconnection of Lots of Links (TRILL) packet, wherein the TRILL packet has a 2-byte outer tag and a 2-byte inner tag, wherein the 2-byte inner tag and the 2-byte outer tag both follow an inner MAC header that follows a TRILL header of the TRILL packet, wherein a service label of 24 bits is carried by the outer tag and the inner tag, wherein 12 bits in the outer tag store higher 12 bits of the service label, and 12 bits in the inner tag store lower 12 bits of the service label, wherein the service label is mapped from the VLAN ID, wherein the service label of 24 bits is an extended service label identifying a service instance, and wherein different service instances are isolated b layer-2 isolation in a TRILL network in which the switch is located; and
send the TRILL packet via another network port in the network ports to another TRILL switch in the TRILL network.

4. The TRILL switch according to claim 3, wherein the processor is further configured to:
send an initial access message that carries a multi topology aware port capability, wherein an enabled virtual local area network field of the multi topology aware port capability comprises a first extended service label information field;
send a first layered service provision message that carries medium access control reachability, wherein the medium access control reachability comprises a second extended service label information field; and
send a second layered service provision message that carries a group address, wherein a group medium access control address of the group address carries a third extended service label information field.

5. A TRILL network, comprising a plurality of TRILL switches according to claim 3.

6. The method according to claim 1, further comprising:
sending, by the TRILL switch, a first layered service provision message that carries medium access control reachability, wherein the medium access control reachability comprises a second extended service label information field.

7. The method according to claim 1, further comprising:
sending, by the TRILL switch, a second layered service provision message that carries a group address, wherein a group medium access control address of the group address carries a third extended service label information field.

8. A Transparent Interconnection of Lots of Links (TRILL) network, comprising:
a plurality of TRILL switches, wherein each of the plurality of TRILL switches is configured to:
receive an Ethernet user packet comprising a virtual local area network (VLAN) ID;
generate a TRILL packet, wherein the TRILL packet has a 2-byte outer tag and a 2-byte inner tag, the 2-byte outer tag and a 2-byte inner tag both following an inner MAC header that follows a TRILL header of the TRILL packet, wherein a service label of 24 bits is carried by the outer tag and the inner tag, wherein 12 bits in the outer tag store higher 12 bits of the service label, and 12 bits in the inner tag store lower 12 bits of the service label, wherein the service label is mapped from the VLAN ID, and wherein the service label of 24 bits is an extended service label identifying a service instance, and wherein different service instances are isolated by layer-2 isolation in a TRILL network in which the respective TRILL switch is located; and
send the TRILL packet to another TRILL switch of the plurality of TRILL switches.

9. The TRILL network according to claim 8, wherein each of the plurality of TRILL switches is further configured to:
sending an initial access message that carries a multi topology aware port capability, wherein an enabled virtual local area network field of the multi topology aware port capability comprises a first extended service label information field.

10. The TRILL network according to claim 8, wherein each of the plurality of TRILL switches is further configured to:
sending, by the TRILL switch, a first layered service provision message that carries medium access control reachability, wherein the medium access control reachability comprises a second extended service label information field.

11. The TRILL network according to claim 8, wherein each of the plurality of TRILL switches is further configured to:
sending, by the TRILL switch, a second layered service provision message that carries a group address, wherein a group medium access control address of the group address carries a third extended service label information field.

* * * * *